March 29, 1938. O. W. ARMSPACH 2,112,685
METHOD OF AND APPARATUS FOR VENTILATING
Filed Feb. 6, 1930
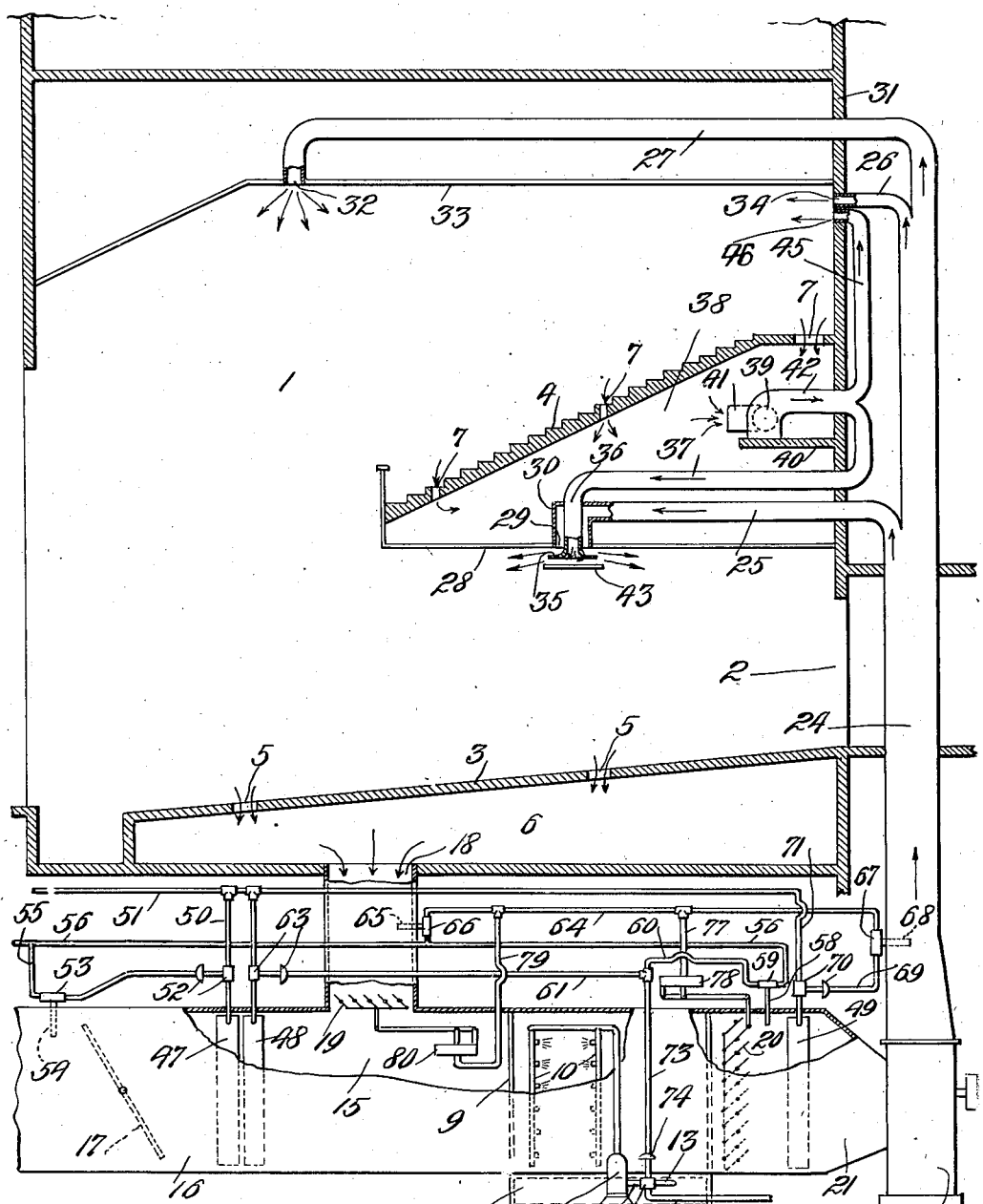
INVENTOR
BY Otto W. Armspach
Archibald Cox
ATTORNEY Patented Mar. 29, 1938

2,112,685

UNITED STATES PATENT OFFICE 2,112,685

METHOD OF AND APPARATUS FOR VENTILATING

Otto W. Armspach, Jackson Heights, N. Y., assignor, by mesne assignments, to Auditorium Conditioning Corporation, Jersey City, N. J., a corporation of New Jersey Application February 6, 1930, Serial No. 426,266

3 Claims. (Cl. 98—33)

The invention relates to an improvement in methods of and apparatus for ventilating enclosures where people assemble, usually in considerable numbers, such as theatres, auditoriums, offices, schools and stores, and deals more particularly with economically creating and maintaining in such enclosures desirable conditions of temperature and humidity with freedom from annoying or discomforting drafts.

According to present-day, approved methods of ventilating peopled enclosures, a large proportion of the air introduced into the enclosure, usually about 75%, is withdrawn from the enclosure for recirculation through the enclosure. The remaining 25% of the air introduced into the enclosure is fresh, outdoor air which is usually passed through an air conditioner before it is introduced into the enclosure. Various systems have been proposed for utilizing this principle of ventilation. One system mixes the fresh air and the air from the enclosure, commonly termed the return or returned air, and passes the mixture through the conditioner, after which it is introduced into the enclosure. Another system passes only the fresh air through the conditioner, then mixes the conditioned air with return air, and then introduces the mixture into the enclosure. And still another system mixes varying proportions of return air with the fresh air both before and after it is passed through the conditioner. One disadvantage of these former systems of ventilation is their high cost of installation and operation. The return air is often withdrawn from the enclosure at points remote from the conditioner or from the chamber in which the fresh air, conditioned or unconditioned, is mixed with the return air. This fact requires long pipes and conduits which necessitate the expenditure of much power. Again, since the fan at the discharge side of the air conditioner is required to introduce into the enclosure the entire volume of conditioned, or mixed conditioned and return air, a relatively large fan and correspondingly large pipes and conduits are needed.

One object of the present invention is to provide within an enclosure where people assemble desired conditions of temperature and humidity by means of a ventilating system which can be produced and operated more cheaply than similar systems heretofore used and which will occupy less floor space than other systems. With this object in view, one feature of the invention consists in conditioning a supply of air, usually fresh, outdoor air, with varying proportions of return air, and conducting the conditioned air, without mixing it with return air, into the enclosure. At the point where the conditioned air enters the enclosure it is deflected by a layer of air of higher temperature which spreads it over a relatively large area before it is permitted to descend and reach the space where it is used by the people in the enclosure. There is thus required only a relatively small fan for introducing the conditioned air into the enclosure, with consequent saving in initial cost, installation space, and in cost of operation; and only a small fan is required to provide the layer of air of higher temperature.

In the above former systems of ventilation the conditioned air and return air, is delivered directly into the enclosure, and hence in order to avoid uncomfortable drafts it is necessary that the temperature of the introduced air differ only slightly, about 8° F., from the temperature of the air of the enclosure. To secure the desired temperature and humidity under these conditions it is accordingly necessary to circulate through the systems about 30 cubic feet per minute per person. By introducing the conditioned air into the enclosure without mixing it with return air according to the principle of the present invention, I am enabled to secure the proper temperature and humidity effects by circulating through the conditioner and conduits connected therewith only about 15 cubic feet per minute per person, and hence the size of fans and ducts can be substantially reduced.

Since the temperature of the conditioned air is usually considerably lower than the temperature of the air in the enclosure, especially in the summer months, I prevent the conditioned air from creating unpleasant drafts by providing a shield or layer of warmer air between the conditioned air and the people in the enclosure. This warmer air can be produced in any desired manner. Preferably, however, I use return air withdrawn from the enclosure at a point adjacent to the point at which the conditioned air is introduced into the enclosure. The conditioned air is introduced into the enclosure as a steady stream, and consequently the shield or layer of warmer or return air is also preferably in the form of a stream. The architectural arrangements of the enclosure to be ventilated will largely determine the manner in which the conditioned air and the returned air are to be delivered into the enclosure. In any situation, however, the two streams of air will be so directed that the stream of warmer or return air will prevent the stream of conditioned air from reaching the people in the enclosure as an uncomfortable draft.

Other objects of the invention will appear as the description proceeds, the invention itself being particularly pointed out in the appended claims.

The improved method of ventilating peopled enclosures constituting one feature of the present invention may be carried out in the apparatus diagrammatically shown on the accompanying drawing, the novel arrangement and operation of portions of this apparatus constituting another feature of the invention. For purpose of illustration, the invention will be described in connection with ventilating the auditorium of a theatre or other hall of public assembly and which is indicated at 1 on the drawing. In the present system of ventilation a pressure slightly higher than atmospheric is maintained in the auditorium so that air leakage or filtration may be outward, and not inward, to avoid the creation of drafts. The air leakage outward will take place through the usual exits, such as around windows and through doors one of which is indicated at 2, or special outlets may be provided for the purpose. In the auditorium is arranged a main assembly area or orchestra having a floor 3, and a balcony having a stepped floor 4. In the floor 3 are cut outlets 5 through which air from the enclosure 1 may pass into the space or chamber 6 formed beneath the floor 3. In the floor 4 of the balcony are cut the openings 7. It will be understood of course that the air outlets will be variously arranged according to the architecture of the enclosure.

The improved ventilating system comprises an air conditioner 9 which may be of usual construction in which are arranged the spray pipes 10 fed with water by the pump 11 from the collecting pan 12 through the pipe 13 or from an outside source through the pipe 14. The air to be conditioned may be taken entirely from outdoors, or the fresh, outdoor air may be mixed with varying proportions of return air drawn from the chamber or space 6. Conditions within the enclosure 1 will determine whether return air is to be mixed with the fresh, outdoor air before the latter is conditioned. The outdoor air is admitted into a chamber 15 through a duct 16 in which is located a damper 17. The space 6 is in communication with the chamber through a conduit 18 in the outlet end of which is located a damper 19 the vanes of which are connected together to be operated simultaneously. At the discharge end of the conditioner 9 is located a damper 20 similar in construction to damper 19. The conditioned air passes into a chamber 21 which discharges into a fan 22 by which the conditioned air is forced through a main duct 24 into the branches or auxiliary ducts 25, 26 and 27.

The branch duct 25 discharges conditioned air into the enclosure at a point above the rear portion of the orchestra. For this purpose the partition or screen 28 under the balcony, which serves as a false ceiling over the rear of the orchestra, is pierced at the point 29 to receive the off-set discharge end 30 of the branch duct 25. The branch duct 26 enters a hole 34 in the wall 31 of the enclosure and discharges conditioned air into the enclosure at a point above and to the rear of the balcony. And the branch duct 27 discharges conditioned air into the forward, upper part of the enclosure through an inlet 32 in the ceiling 33. The arrangement of the inlets 29, 34 and 32 is illustrative only, and it will be understood that there will be several series of these inlets variously located according to the style and nature of the building containing the enclosure to be ventilated.

Where the conditioned air is introduced into the enclosure at points relatively remote from the assembly areas, as at the inlet 32, the conditioned air may be delivered directly into the enclosure, without the blanketing effect of the layer of warmer air, without causing uncomfortable effects on the people occupying the assembly areas. This is because the stream or streams of conditioned air are tempered by the air of the enclosure before reaching the assembly areas. Where, however, the conditioned air is introduced into the enclosure at points relatively near the assembly areas, as at the inlets 29 and 34, it is necessary when the conditioned air is considerably lower in temperature than the air of the enclosure, to prevent the stream or streams of conditioned air from reaching the assembly areas before becoming thoroughly tempered by the air of the enclosure. To prevent the stream or streams of conditioned air from reaching the assembly areas as uncomfortably cold drafts I preferably employ a method of introducing the conditioned air into the enclosure which consists of two steps: (1) directing the stream of conditioned air to a point or points other than directly toward the assembly area; and (2) interposing between the stream of conditioned air and the assembly area a blanket or layer of air warmer than the conditioned air. This blanket or layer of warmer air will preferably be in the form of a stream directed in the same direction as the stream of conditioned air, so as to cause the conditioned air to spread over a relatively large area before it descends sufficiently far toward the assembly area to be felt as an uncomfortable draft.

The means by which the stream or streams of conditioned air can be discharged into the enclosure without directly reaching the assembly area or areas are various, and in the illustrated embodiment of the invention I show two such arrangements. In situations like that obtaining at the rear of the main assembly area or orchestra, the conditioned air may be introduced as a radially directed stream pointing in all directions, the stream being substantially parallel with the ceiling 28 which may act as a guard or deflector to assist in directing the circular stream of air outwardly substantially parallel with the assembly area beneath it. Cooperating with the ceiling 28 to direct the conditioned air discharging through the inlet 29 as a stream substantially parallel to the assembly area of the orchestra is an annular flange 35 carried by the lower end of the offset portion 36 of a pipe 37 which is used for introducing the warmer air into the enclosure. In the illustrated arrangement the warmer air for blanketing the conditioned air discharging through the inlet 29 is taken from the space 38 formed between the balcony flooring 4 and the ceiling 28. In the space 38 is located a fan 39 supported on a shelf 40 projecting inwardly from the wall 31. The fan 39 is provided with an inlet 41 and with a discharge pipe 42 of which the pipe 37 is one branch. Beneath the annular flange 35 of the pipe 37 is located a disk-like plate 43 arranged parallelly with the flange 35. The plate 43 acts as a baffle for the warmer air discharging through the pipe 37 and directs it radially outwardly substantially parallel with the stream of conditioned air passing through the annular opening 29 surrounding the discharge portion of the pipe 37. This arrangement effectively directs the relatively cold conditioned air radially outwardly into a relatively large area before any substantial amount of it descends and reaches the assembly area of the orchestra as an uncomfortable draft.

In such situations as that presented by the space above the assembly area of the balcony, the conditioned air may be introduced as a stream of suitable width close to and parallel with the ceiling 33, while the stratum of warmer air may be formed immediately beneath the stream of conditioned air as a stream of equal or greater width delivered into the enclosure from the branch conduit 45 of the pipe 42, the discharge orifice 46 of which pierces the wall 31 below the inlet 34. In this arrangement also the colder conditioned air can not reach the assembly area of the balcony until it has been properly diffused over a sufficiently large area to prevent its reaching the assembly area of the balcony as a perceptibly cold draft.

The temperature and humidity conditions within the enclosure are, of course, affected by the people therein and in two ways: (1) The heat given off by the bodies of the people produces an increase in the sensible heat content of the air and a consequent rise in the dry bulb temperature; and (2) the moisture evaporated from the bodies and the moisture contained in the exhaled breath of the people produces a rise in the moisture content of the air and a corresponding rise in the dew point temperature.

These two effects may be more clearly illustrated in the following example: It is assumed that the enclosure contains 1000 occupants and that it is desired to maintain in the breathing zone of the assembly areas a dry bulb temperature of 75° F., and a relative humidity of 55%. The wet bulb temperature under these conditions will be 64° F., and the dew point temperature 57½° F. The 1000 occupants of the enclosure will add sensible heat to the air in the enclosure at the rate of approximately 4500 B. t. u. per minute, and the sensible heat from the electric lights and that conducted through the walls will equal approximately 1500 B. t. u. per minute. The 1000 occupants of the enclosure will expel into the air approximately 15,000 grains of moisture per minute. Consequently, in order to maintain a dew point temperature of 57½° F. in the breathing zone of the assembly areas it will be necessary to introduce air into the enclosure at about 52° F., so that when the 15,000 grains of moisture per minute are expelled into the air from the occupants of the enclosure, the final moisture content of the air of the enclosure will result in a dew point temperature of 57½° F. The increase in dew point temperature due to the moisture expelled into the enclosure by the 1000 occupants will increase the dew point temperature of the air introduced into the enclosure approximately 5½° F. Accordingly, the air introduced into the enclosure should have a dew point temperature of about 52° F. Hence, the air leaving the conditioner should be about 52° F. If the conditioner functions properly the air discharged from it will be completely saturated and therefore, the dry bulb temperature of the conditioned air introduced into the enclosure will be about 52° F. To absorb the 6000 B. t. u. of sensible heat and leave a final temperature of 75° F. in the enclosure there will be required 14,300 cubic feet of air per minute, or 14.3 cubic feet of air per minute per occupant.

To obtain and maintain in the enclosure the foregoing air conditions, I associate with the air conditioner 9, fresh air duct 16 and the return air duct 18, the following devices and instruments: In the fresh air duct 16 are located two heaters 47 and 48 by which sensible heat may be added to the fresh air to prevent it from freezing the water of the conditioner 9 during cold weather. These heaters are also a means of adding the desired amount of sensible heat to the air entering the conditioner to maintain the air leaving the conditioner at the desired temperature. In the chamber 21 at the discharge end of the conditioner there is a heater 49 to add to the conditioned air the required amount of sensible heat to maintain the proper temperature conditions within the enclosure 1. Heater 47 is fed with steam from a branch pipe 50 leading from a main steam line 51. Admission of steam into the heater 47 is controlled by a diaphragm valve 52, in turn controlled by the thermostat 53 the bulb 54 of which is located in the fresh air duct 16. The thermostat 53 is connected by the pipe 55 with a main source of compressed air 56. The thermostat 53 is set at approximately 33° F., so that when the air entering the duct 16 from outdoors falls to this temperature, the thermostat 53 will close and permit valve 52 to open and allow steam to enter the heater 47.

In the chamber 21 at a point between the discharge end of the air conditioner 9 and the heater 49 is located the bulb 58 of the thermostat 59 which is set to maintain the desired saturation temperature of the air leaving the conditioner, this temperature being below the dew point temperature of the air to be maintained in the enclosure 1. Whenever the temperature of the conditioned air passing through the chamber 21 is above the setting of the thermostat 59, compressed air will flow from pipe 56 and through the pipe 60 and 61 to a diaphragm valve 63, thereby closing this valve and preventing steam from entering the heater 48. On the other hand when the temperature of the conditioned air passing through the chamber 21 is below the desired dew point temperature, the thermostat 59 will operate to permit steam to enter the heater 48.

In the duct 18 leading from the space or chamber 6 below the floor 3 of the orchestra is located the bulb 65 of the thermostat 66 connected with the source of compressed air 56. The thermostat 66 is connected by a pipe 64 with a thermostat 67 the bulb 68 of which is located in the main conditioned air duct 24. The thermostat 67 is connected by a pipe 69 with a diaphragm valve 70 located in the pipe 71 leading from the steam pipe 51 to the heater 49. The thermostat 66 acts as a pilot for the thermostat 67 and whenever the temperature of the air withdrawn from the enclosure 1 is below the setting of thermostat 66 it shuts off the pipes 64 and 69 from the source of compressed air and permits the valve 70 to open to allow steam to enter the heater 49. As the temperature of the air withdrawn from the enclosure 1 reaches the setting of thermostat 66 the latter opens and permits compressed air to pass through the pipe 64 and reach the thermostat 67. If the temperature of the air passing through the duct 24 is above the setting of thermostat 67, the compressed air will flow from pipe 64 into pipe 69 and close valve 70, shutting off the steam from heater 49. While the temperature of the conditioned air passing through duct 24 is below the setting of thermostat 67 the steam valve 70 will remain open regardless of the temperature of the air passing through the conduit 18.

During the summer months the temperature of the air outdoors is usually sufficiently high to furnish the necessary sensible heat required in the system and consequently the heaters 47, 48 and 49 will be shut off from the steam supply. In fact the temperature of the outdoor air drawn into the system during the summer months will frequently require the use of refrigerated water in the conditioner in order to hold the dew point temperature and relative humidity of the air in the enclosure at the desired points. When the wet bulb temperature of the air entering the system through the conduit 16 is above the setting of the thermostat 59 the cold water from source 14 is supplied to the conditioner 9 to condense the surplus moisture out of the air introduced into the enclosure. The thermostat 59 is set according to the desired dew point temperature of the air leaving the conditioner. The thermostat 59 is connected by the pipe 60 and the pipe 73 with a diaphragm valve 74 the part 75 of which acts as a three-way valve and is connected with the pipes 13 and 14, and by the pipe 76 with the pump 11. Whenever the temperature of the air leaving the conditioner is below the setting of the thermostat 59 the latter will control the valve 74, 75 to admit to the spray pipes 10 a greater amount of relatively warm water from the pan 12 through the pipe 13 and a lesser amount of relatively cold water through the pipe 14 connected with the source of cold water. And on the other hand, when the temperature of the air leaving the conditioner is above the setting of the thermostat 59 the valve 74, 75 will be controlled to admit a lesser amount of relatively warm water through the pipe 13 and a greater amount of relatively cold water through the pipe 14 to the spray pipes 10. Thus the thermostat 59 maintains at a substantially constant temperature the desired saturation temperature of the air leaving the conditioner.

The thermostat 66 is connected by the pipe 77 with an air-operated damper motor 78 which regulates the damper 20. The thermostat 66 is also connected by means of the pipe 79 with an air-operated damper motor 80 which controls damper 19. When the temperature of the air passing through the conduit 18 is below the setting of thermostat 66 motors 78 and 80 are operated substantially simultaneously to close slightly the dampers 20 and 19. Under these conditions a reduced amount of air will be delivered into the enclosure 1. Thereupon the sensible heat given off by the occupants of the enclosure will raise the temperature of the air therein until the temperature of the return air passing through the conduit 18 reaches the setting of thermostat 66. Thermostat 66 will then cause motors 78 and 80 to move the dampers 20 and 19 again to permit the increased amount of relatively cold air to enter the enclosure to absorb the sensible heat which has been liberated therein by the occupants. It will be understood, therefore, that the dry bulb temperature of the air in the enclosure is controlled by varying the volume of conditioned air supplied thereto, and that when the temperature falls a reduced amount of air is delivered into the enclosure and a reduced amount of air is withdrawn from the enclosure. The fresh air taken in through the conduit 16 will, however, remain approximately constant.

The damper 17 in the fresh air conduit 16 is adjusted so that the air taken into the system will maintain the air within the enclosure 1 at a pressure slightly higher than atmospheric to prevent drafts from outdoors inwardly into the enclosure. It is moreover necessary to admit the outdoor air to prevent noticeable clothing and body odors within the enclosure. It has been found that substantially 7 cubic feet per minute per person should be taken into the enclosure from outdoors. Under usual conditions therefore, damper 17 will be set to permit this amount of outdoor air to enter the system. The maximum economy of operation will also require that during the greater part of the year not more than approximately 7 cubic feet per minute per person be admitted from outdoors, and accordingly the position of damper 17 will remain practically constant during the greater part of the year. During the winter months the damper 20 may be fixed in one position, and the temperature of the air in the enclosure regulated by the heater 49 as controlled by the thermostats 66 and 67.

What I claim is:—

1. In an apparatus for ventilating enclosures having an assembly area, said apparatus including an air conditioner, means for introducing cold conditioned air as a stream into the enclosure, means for deflecting the stream of conditioned air into a direction other than directly toward the assembly area, and means for introducing a stream of warm air into the enclosure between the stream of conditioned air and the assembly area and substantially parallel with the stream of conditioned air for reheating and retarding the descent of the conditioned air toward the assembly area.

2. The process of diffusing cold air into the occupied area of a room which comprises introducing the cold air at the top of the room, deflecting said cold air laterally below the ceiling, creating a flow of warm air and directing said flow of warm air laterally below the ceiling and directly below said cold air and allowing the cold air to gradually diffuse into the occupied area of the room.

3. The method of ventilating an enclosure having an assembly area comprising conditioning air to a temperature below the temperature of the air in said assembly area, introducing the conditioned air into the enclosure, deflecting said conditioned air laterally below the ceiling of the enclosure, creating a flow of warm air having a higher temperature than the temperature of said conditioned air and directing said flow of warm air laterally below said ceiling and directly below said conditioned air and allowing the conditioned air to gradually diffuse into the occupied area of the enclosure.

OTTO W. ARMSPACH.